July 4, 1933.  C. J. HOLLAND  1,916,317
VOLUTE SPRING STRUCTURE FOR LATERAL MOTION TRUCKS
Original Filed July 25, 1927

Inventor
Cyrus J. Holland

Patented July 4, 1933

1,916,317

UNITED STATES PATENT OFFICE

CYRUS J. HOLLAND, OF CHICAGO, ILLINOIS

VOLUTE SPRING STRUCTURE FOR LATERAL MOTION TRUCKS

Original application filed July 25, 1927, Serial No. 208,349. Divided and this application filed October 29, 1930. Serial No. 492,046.

This application is a division of my copending application for patent for volute spring structure for railway trucks, filed July 25th, 1927 and given Serial No. 208,349.

The invention relates to cushioning devices or spring means used in railway trucks for resiliently supporting the load and has special reference to a peculiarly mounted spring means for use in a lateral motion truck, that is to say one in which the truck bolster is capable of movement transversely with respect to the side frames.

Until about ten years ago the provision of cushioning means in railway freight car trucks was a comparatively simple problem to solve, a common practice being to provide a suitable number of helical springs interposed between the spring plank and the bolster because the standard A. R. A. double coil freight car truck spring provided the necessary capacity for the various classes of cars by varying the number of coils used in accordance with the capacity of the car. Ordinarily the window opening in such trucks, both arch bar and cast steel truck side frame, limited the number of springs in the nest to five double coils. About ten years ago the American Railway Association changed the method of figuring the capacity of a car so that a 100,000 pound capacity car, which at that time was permitted to carry a 10% overload, became a car that could carry a maximum of 169,000 pounds including the weight of the car. This change permitted cars to be loaded heavier under the new ruling than under the old and developed the fact that the five double coil spring nest did not have sufficient capacity to take care of the new load. The A. R. A. have since that time endeavored to increase the capacity of their standard double coil truck spring from 16,000 pounds to 20,000 pounds per double coil. In an effort to do this they designed a chrome molybdenum double coil spring fully described in the Car Builders Encyclopedia of 1922 and subsequent issues. However, this spring appears not to have met the requirements because it has not gone into general use and as an alternative cars of 169,000 pounds capacity and over have generally been equipped with the Dalman or similar type of truck in which a larger window opening is provided which permits of using more than five coils in the spring nest.

It is with the above facts in view that I have designed the present invention which has for its general object the provision of truck springs of such character as to have the necessary capacity without increasing the number in the group over the number of helical springs commonly used, and without necessitating any change in the side frames, the size of the window openings or the wheel base.

An important object of the invention is to provide spring means of such high capacity type which may be installed in already existing trucks without necessitating any changes or modifications therein.

More specifically stated, the invention resides in the employment of volute springs in railway trucks instead of the usual helical springs as I have discovered that springs of the first mentioned form have a much greater capacity, size for size, than those of the latter mentioned type.

Another object of the invention is to provide a group of volute springs which may be initially assembled for subsequent installation within the window opening of a side frame, various alternative arrangements, in point of relation, etc., being contemplated.

A still further object of the invention is to provide volute truck springs capable of being so mounted as to permit lateral motion of the truck bolster with respect to the side frames without any necessity for the employment of the usual rollers, the advantages of lateral motion being thus attained without the expense of special equipment.

To the attainment of the foregoing and other objects and advantages, the invention preferably consists in the details of construction and the arrangement and combination of parts to be hereinafter more fully described and claimed, and illustrated in the accompanying drawing in which:

Figure 1:
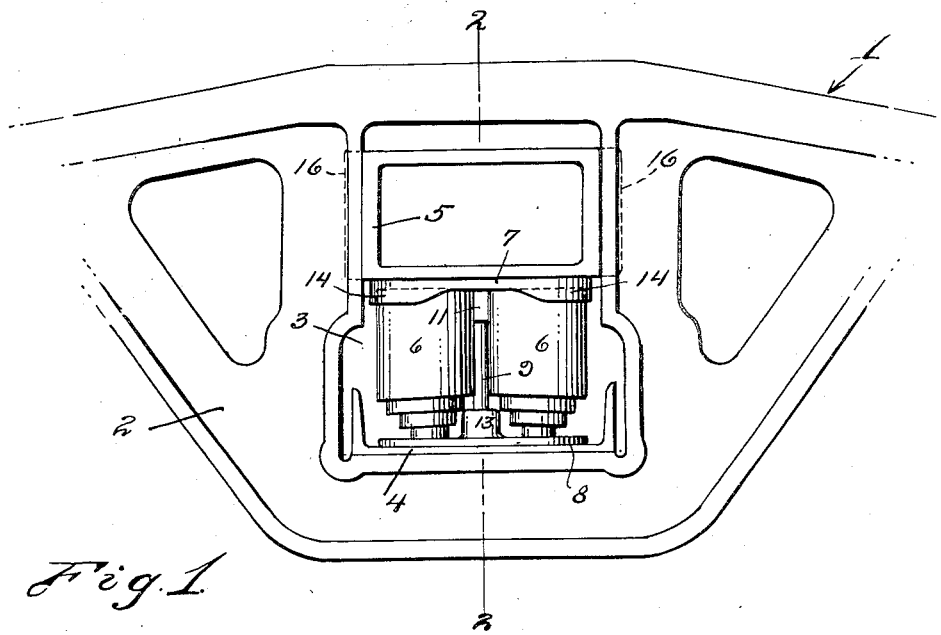
Figure 1 is a fragmentary side elevation of a truck embodying my invention.
Figure 2:
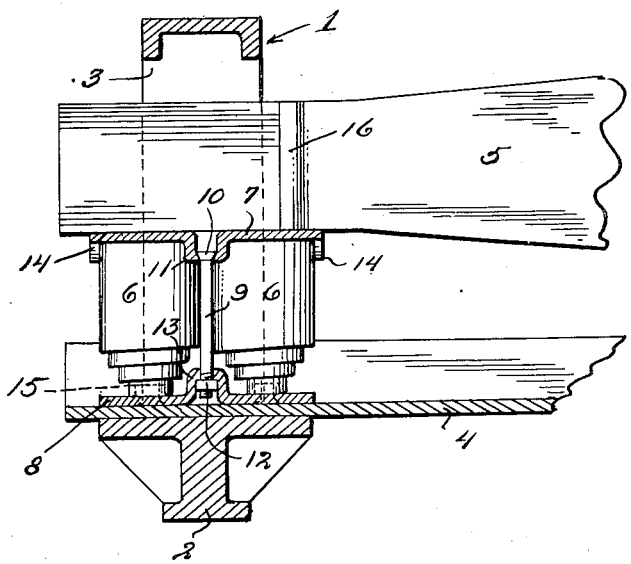
Figure 2 is a vertical section taken on substantially the line 2—2 of Figure 1.

Referring more particularly to the drawing, the numeral 1 designates, generally, a truck including the usual or any preferred side frame 2 having a window opening 3 at the bottom of which is mounted a spring plank 4 and within the upper portion of which is mounted the bolster 5. The truck of course includes the usual journal boxes, wheels and other details which need not be described as they are old and well known and form no part of the present invention. It is the customary practice to provide some arrangement or other of helical springs within the window opening 3 for the purpose of supporting the bolster 5 and the spring means constituting the subject matter of this application is mounted in the same position as ordinarily though the form of the springs is entirely different as will be explained.

In accordance with my invention I provide a cushioning means for the bolster formed as a group or cluster of volute springs 6 suitably confined between upper and lower caps 7 and 8, respectively, which are naturally of a size and shape suitable to be received within the window opening of the side frame, the lower cap 8 engaging upon the spring plank and the upper cap 7 bearing against the underside of the bolster 5. For the purposes of the present invention the springs 6 are shown as having their small ends all in the same relative positions and it is preferable that the springs be arranged with their small ends down as clearly illustrated.

To hold the nest in assembled position some means must be provided such as the tie bolt 9 which has a head 10 engaging within a depressed socket 11 in the upper cap, and which has its other end carrying a nut 12 received within a similar pressed-out socket 13 in the lower cap. For maintaining the springs themselves against displacement with respect to the caps so that they will be constantly maintained in proper position, any suitable means may be provided such for instance as the flanges 14 on the corner portions of the upper cap engaging exteriorly against the larger ends of the springs, and the upstanding struck-out projections 15, or their equivalent, on the lower cap 8 entering within the lower ends or smaller convolutions of the springs.

It is well known that various devices have been provided for holding a spring nest in proper position within the window opening itself and any suitable means for this purpose may be provided in the present instance, no detailed disclosure in this respect being given as such is unnecessary to a proper understanding of what constitutes the real invention. It is also known that in lateral motion trucks it is common to provide stop lugs such as those illustrated at 16 on the bolster 5, which stop lugs are adapted to engage against the inner faces of the side frames for limiting the lateral motion beyond that which is desirable or permissible in service.

In the operation, it will be apparent that the volute springs will act to cushion the load in the same general manner as the well known helical springs. However, it has been found that springs of the volute type have a much greater capacity for equal over-all dimensions than the usual or helical springs so that it becomes a simple matter to sustain the heaviest loads without increasing the size or number of the springs and without modifying the structure of the truck or any parts thereof. By means of the tie bolt 9 and the nut 12 thereon it is intended that the springs be initially compressed to a certain extent. Furthermore it is easily possible to make the springs of stock which is tapered either in thickness or width, or both, as set forth in my co-pending application filed of even date herewith in order that the proper capacity at any point in the travel will be assured. The resistance can be regulated to give almost any increments in travel instead of there being a fixed relation as in a helical spring. Friction between the coils can be permitted or prevented, depending upon which is determined to be preferable and this is naturally a matter of spacing of the coils. The specific details in this respect are discussed in said co-pending application and need not herein repeated.

In addition to the advantage gained, broadly, by the use of volute springs as I contemplate, the arrangement of these volute springs with their small ends down will permit the body bolster 5 to move laterally of the truck upon the occurrence of an event or condition tending to develop centrifugal force, as for instance when a car rounds a curve. The springs in this case take the place of the usual and well known lateral motion device and it is therefore clear that they perform a double function while at the same time the number of necessary parts is reduced.

From the foregoing description and a study of the drawing it will be apparent that I have thus provided a very simple and inexpensive arrangement by means of which all of the desired results will be obtained. It is thought that the construction, operation and advantages should be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention. I claim:

1. In a railway car truck including side frames having window openings therein, and a bolster having its ends movable vertically and laterally within and with respect to said openings, the combinations of volute spring means located within the window openings for supporting the bolster ends, said spring means serving as rockers to permit lateral motion of the bolster.

2. In a railway car truck including side frames having window openings therein and further including a bolster having its ends extending within and movable vertically within said window openings, said bolster being capable of lateral motion with respect to the side frames, the combination of a plurality of volute springs arranged within each window opening for supporting the bolster, said volute springs being normally vertical and all arranged in the same relative positions and rockably supporting the bolster whereby the latter may have lateral motion.

3. In a railway car truck including side frames having window openings therein and further including a bolster capable of lateral motion with respect to the side frames and having its ends projecting into said window openings, the combination of a plurality of volute springs located within each window opening and having their small ends down and their large ends engaging beneath the bolster whereby said springs will yieldably support the bolster for cushioning the load and will also serve as rockers permitting lateral motion of the bolster.

4. A shock absorbing assembly for supporting the bolster of a railway car truck, comprising a nest of volute springs arranged in the same relative positions side by side and all on the same level and confined between spring caps capable of relative lateral movement so that the springs may yield laterally.

5. A shock absorbing assembly for supporting the bolster of a railway car truck, comprising a nest of volute springs arranged in the same relative positions side by side at the same level and confined between spring caps and held under initial compression, the caps being capable of relative lateral movement whereby the springs may be laterally distortable to perform the function of rockers.

6. In combination with a side frame having a window opening therein through which extends the end of a truck bolster, a spring nest adapted for insertion in said window opening and comprising a plurality of volute springs arranged side by side and at the same level in the same relative position whereby their small ends will all be located at the same side of the unit, said springs being normally in vertical position and supporting the bolster and being capable of rocking movement to permit lateral motion of the bolster without the employment of rockers.

7. In combination with a side frame having a window opening therein through which extends the end of a truck bolster capable of lateral motion, a spring unit adapted for insertion within the window opening to support the bolster, said unit comprising spaced caps and a plurality of volute springs interposed therebetween, said springs being arranged side by side at the same level with the small ends of all abutting one cap and the large ends abutting the other whereby the smaller ends will serve as fulcrums upon which the volute springs may rock during lateral motion of the bolster.

8. A spring assembly comprising spaced caps, a plurality of volute springs arranged side by side therebetween with the large ends of all abutting one cap and the small ends of all abutting the other cap, means tying the caps together, means on one cap for centering the small ends of the springs, and means on the other cap engaging exteriorly against the larger ends of the springs for centering them whereby the springs will have their centers open and unobstructed, the axes of the springs being normally vertical and being tiltable laterally whereby the springs may perform the function of rockers.

In testimony whereof I affix my signature.

CYRUS J. HOLLAND.